US012608220B2

(12) United States Patent
Lu et al.

(10) Patent No.: US 12,608,220 B2
(45) Date of Patent: Apr. 21, 2026

(54) VIRTUALIZATION METHOD, DEVICE, BOARD CARD AND COMPUTER READABLE STORAGE MEDIUM

(71) Applicant: Anhui Cambricon Information Technology Co., Ltd., Hefei (CN)

(72) Inventors: Haibo Lu, Hefei (CN); Guangdi Zhou, Hefei (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 625 days.

(21) Appl. No.: 17/904,820

(22) PCT Filed: Feb. 25, 2021

(86) PCT No.: PCT/CN2021/077978
§ 371 (c)(1),
(2) Date: Aug. 23, 2022

(87) PCT Pub. No.: WO2021/170055
PCT Pub. Date: Sep. 2, 2021

(65) Prior Publication Data
US 2023/0111051 A1 Apr. 13, 2023

(30) Foreign Application Priority Data

Feb. 28, 2020 (CN) .......................... 202010130697.X
Feb. 28, 2020 (CN) .......................... 202010130713.5
(Continued)

(51) Int. Cl.
*G06F 9/455* (2018.01)
*G06F 13/42* (2006.01)
*H04N 19/42* (2014.01)

(52) U.S. Cl.
CPC ...... *G06F 9/45558* (2013.01); *G06F 13/4221* (2013.01); *G06F 2009/45579* (2013.01); *G06F 2213/0026* (2013.01); *H04N 19/42* (2014.11)

(58) Field of Classification Search
None
See application file for complete search history.

(56) References Cited

U.S. PATENT DOCUMENTS

2020/0167654 A1* 5/2020 Guo ........................ G06N 3/063
2020/0322287 A1* 10/2020 Connor ................. H04L 49/356
(Continued)

FOREIGN PATENT DOCUMENTS

CN        1311326 C        4/2007
CN        103428582 A        12/2013
(Continued)

OTHER PUBLICATIONS

PCT/CN2021/077978—International Search Report and Written Opinion, mailed May 31, 2022, 18 pages.
(Continued)

*Primary Examiner* — Bradley A Teets
*Assistant Examiner* — Melissa A Headly
(74) *Attorney, Agent, or Firm* — Getech Law LLC; Jun Ye

(57) ABSTRACT

The present disclosure relates to a method, device, a board card, and a computer-readable storage medium for virtualizing a computer framework, where the computer framework includes a user space, a kernel space and an on-chip system. The on-chip system includes a computing device, a video encoding and decoding device, a JPEG encoding and decoding device and a storage device, where the devices interact with the user space and the kernel space to jointly perform specified computing operations.

19 Claims, 7 Drawing Sheets

(30) Foreign Application Priority Data

| | | |
|---|---|---|
| Feb. 28, 2020 | (CN) | .......................... 202010131485.3 |
| Feb. 28, 2020 | (CN) | .......................... 202010131501.9 |

(56) References Cited

U.S. PATENT DOCUMENTS

| | | | | |
|---|---|---|---|---|
| 2020/0409733 A1* | 12/2020 | Sankaran | .............. | G06F 9/5077 |
| 2021/0006511 A1* | 1/2021 | Uminski | .......... | G06F 15/17331 |
| 2022/0066807 A1* | 3/2022 | Kashyap | .............. | G06F 3/0604 |

FOREIGN PATENT DOCUMENTS

| | | |
|---|---|---|
| CN | 108777634 A | 11/2018 |
| CN | 108897601 A | 11/2018 |
| CN | 108989811 A | 12/2018 |
| CN | 109643291 A | 4/2019 |
| CN | 112395071 A | 2/2021 |
| CN | 112433823 A | 3/2021 |
| JP | 2015132887 A | 7/2015 |
| WO | 2018008605 | 1/2018 |
| WO | 2019058874 | 3/2019 |

OTHER PUBLICATIONS

Vu et al., "Enabling Partial Reconfiguration for Coprocessors in Mixed Criticality Multicore Systems Using PCI Express Single-Root I/O Virtualization", 2014 International Conference on ReConFigurable Computing and FPGAs, Sections 1-4, Dec. 10, 2014, pp. 1-6.

CN202011177174.7—Office Action mailed on Jul. 16, 2025, 16 pages.

CN202010130697.X—Office Action mailed on Jul. 12, 2025, 18 pages.

CN202010130713.5—Office Action mailed on Jul. 12, 2025, 22 pages.

CN202010131485.3—Office Action mailed on Jul. 11, 2025, 22 pages.

CN202011177207.8—Office Action mailed on Jul. 12, 2025, 18 pages.

CN202010131501.9—Office Action mailed on Nov. 22, 2025, 22 pages.

CN202011177174.7—Office Action Mailed on Mar. 13, 2026, 24 pages.

Plessl et al., "Virtualization of Hardware—Introduction and Survey", ERSA, Computer Engineering & Networks Lab Swiss Federal Institute of Technology, Dec. 31, 2004, 7 pages.

* cited by examiner

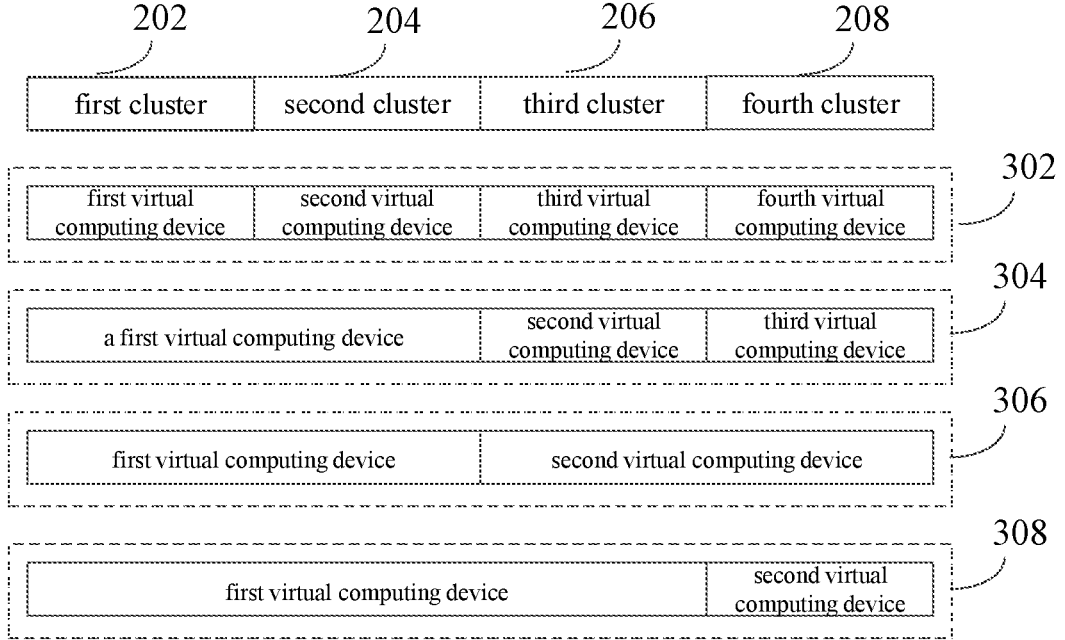

202        204        206        208

| first cluster | second cluster | third cluster | fourth cluster |

302

| first virtual computing device | second virtual computing device | third virtual computing device | fourth virtual computing device |

304

| a first virtual computing device | second virtual computing device | third virtual computing device |

306

| first virtual computing device | second virtual computing device |

308

| first virtual computing device | second virtual computing device |

Fig. 3

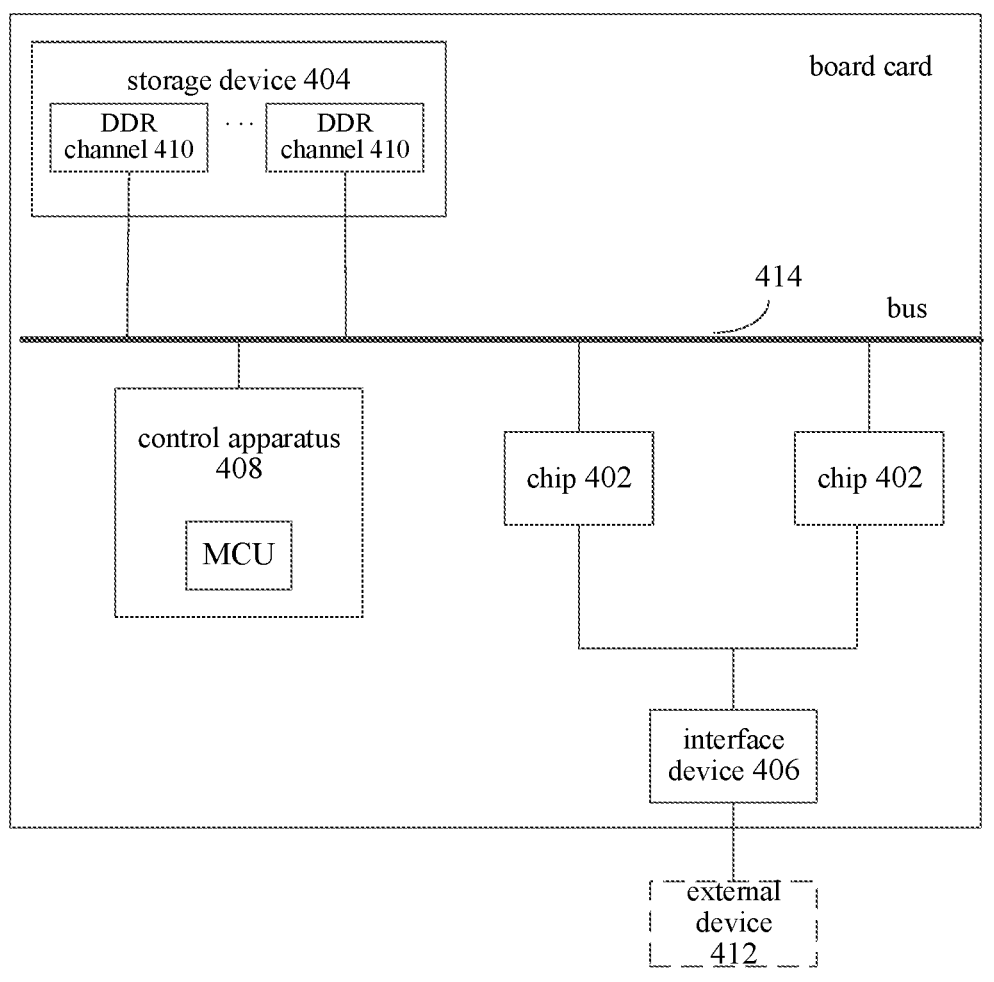
Fig. 4

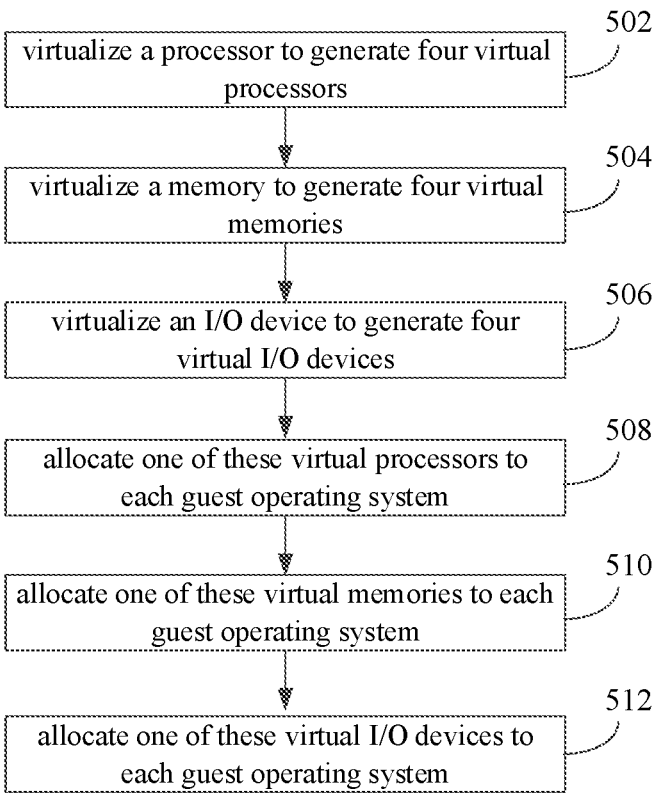

502 virtualize a processor to generate four virtual processors

504 virtualize a memory to generate four virtual memories

506 virtualize an I/O device to generate four virtual I/O devices

508 allocate one of these virtual processors to each guest operating system

510 allocate one of these virtual memories to each guest operating system

512 allocate one of these virtual I/O devices to each guest operating system

Fig. 5

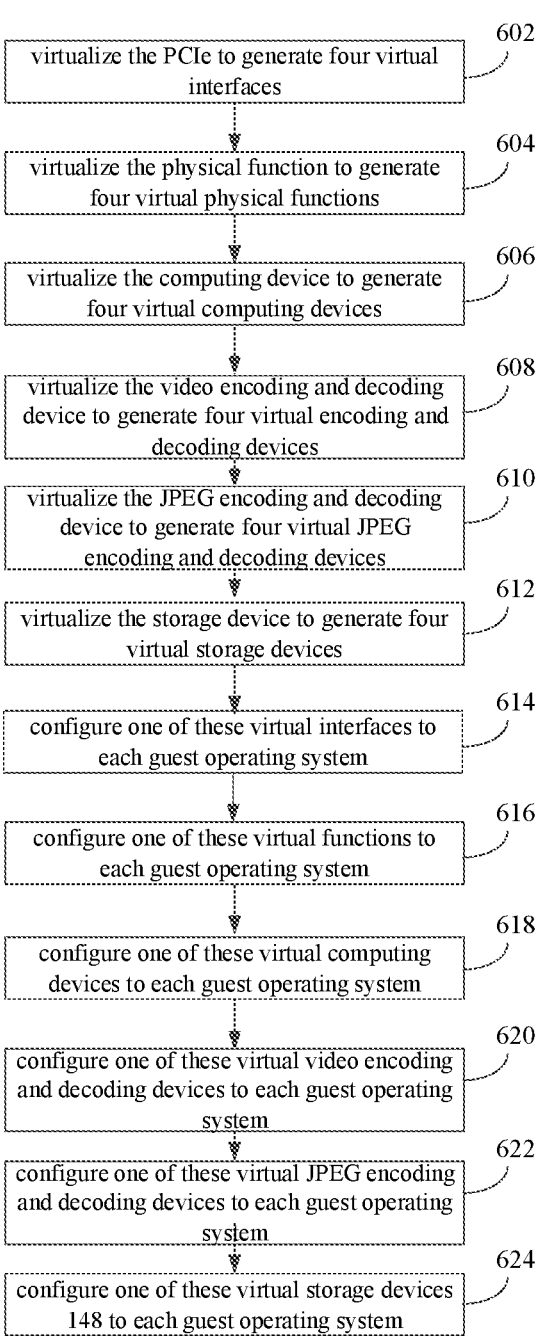

virtualize the PCIe to generate four virtual interfaces — 602 virtualize the physical function to generate four virtual physical functions — 604 virtualize the computing device to generate four virtual computing devices — 606 virtualize the video encoding and decoding device to generate four virtual encoding and decoding devices — 608 virtualize the JPEG encoding and decoding device to generate four virtual JPEG encoding and decoding devices — 610 virtualize the storage device to generate four virtual storage devices — 612 configure one of these virtual interfaces to each guest operating system — 614 configure one of these virtual functions to each guest operating system — 616 configure one of these virtual computing devices to each guest operating system — 618 configure one of these virtual video encoding and decoding devices to each guest operating system — 620 configure one of these virtual JPEG encoding and decoding devices to each guest operating system — 622 configure one of these virtual storage devices 148 to each guest operating system — 624

Fig. 6

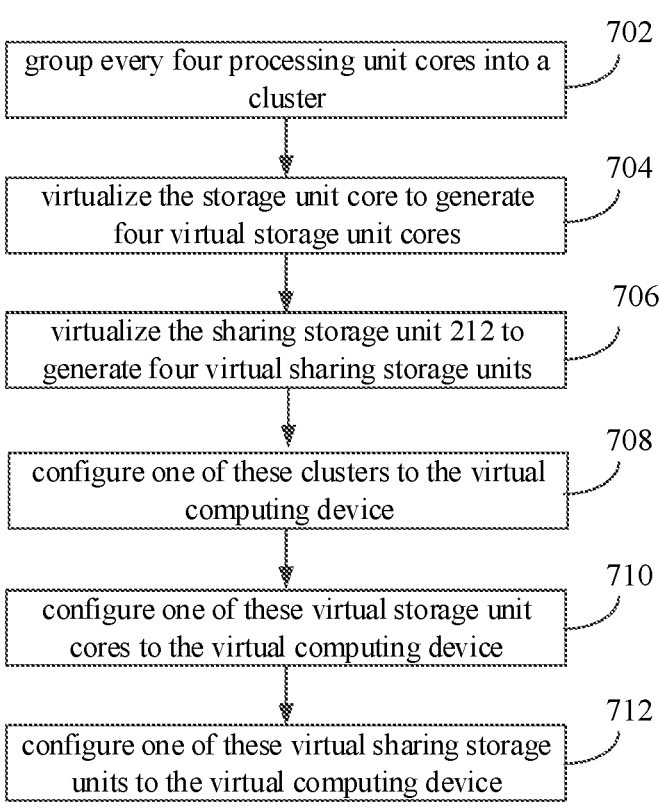

group every four processing unit cores into a cluster 702 virtualize the storage unit core to generate four virtual storage unit cores 704 virtualize the sharing storage unit 212 to generate four virtual sharing storage units 706 configure one of these clusters to the virtual computing device 708 configure one of these virtual storage unit cores to the virtual computing device 710 configure one of these virtual sharing storage units to the virtual computing device 712

Fig. 7

VIRTUALIZATION METHOD, DEVICE, BOARD CARD AND COMPUTER READABLE STORAGE MEDIUM

CROSS REFERENCE OF RELATED APPLICATION

This is a 371 of International Application No. PCT/CN2021/077978, filed Feb. 25, 2021, which claims priority to Chinese Patent Application No. 2020101314853 with the title of "VIRTUALIZATION METHOD, DEVICE, BOARD CARD AND COMPUTER READABLE STORAGE MEDIUM" filed on Feb. 28, 2020; the present application claims priority to Chinese Patent Application No. 2020101315019 with the title of "VIRTUALIZATION METHOD, DEVICE, BOARD CARD AND COMPUTER READABLE STORAGE MEDIUM" field on Feb. 28, 2020; the present application claims priority to Chinese Patent Application No. 202010130697X with the title of "VIRTUALIZATION METHOD, DEVICE, BOARD CARD AND COMPUTER READABLE STORAGE MEDIUM" field on Feb. 28, 2020; the present application claims priority to Chinese Patent Application No. 2020101307135 with the title of "VIRTUALIZATION METHOD, DEVICE, BOARD CARD AND COMPUTER READABLE STORAGE MEDIUM" field on Feb. 28, 2020; the present application claims priority to Chinese Patent Application No. 2020111771747 with the title of "ON-CHIP SYSTEM AND BOARD CARD" field on Feb. 28, 2020; the present application claims priority to Chinese Patent Application No. 2020111772078 with the title of "ON-CHIP SYSTEM AND BOARD CARD" field on Feb. 28, 2020. The contents of the aforementioned applications are incorporated herein by reference in their entireties.

TECHNICAL FIELD

The present disclosure generally relates to the field of computer, and in particular to a method, device, a board card, and a computer-readable storage medium for virtualizing a computer framework.

BACKGROUND

Time-slice rotation scheduling is the most widely used algorithm in the computer field. Each process is assigned a time period, called a time slice, which is the amount of time the process is allowed to run. If a process is still running at the end of the time slice, the process suspends and processor resources are allocated to another process. If a process blocks or ends before the end of the time slice, a processor switches immediately. A scheduler has to do is to maintain a list of ready processes, and when a process has used up the time slice allocated to it, other tasks in the process are moved to the end of a queue.

The time-slice rotation scheduling has many problems, for example, the quality of service (QoS), isolation and head-of-line blocking (HOL) are not guaranteed. Especially in the field of artificial intelligence chip, which requires a large amount of computing resources. If the time-slice rotation scheduling is used to configure computer resources, the operation efficiency will be too low. Therefore, how to obtain a reasonable configuration of hardware resources is still a problem to be solved in the existing technology.

SUMMARY

2020101314853 In order to at least partially solve the technical problems mentioned in the background, solutions of the present disclosure provide a method, a device, a board card, and a computer-readable storage medium for virtualizing a computer framework.

A first aspect of the present disclosure provides a machine learning device connected to a user space that carries N operating systems, where N is a positive integer. The machine learning device includes a PCIe (Peripheral Component Interconnect Express), a computing device, and an ROM (read-only memory). The PCIe is virtualized into at least N virtual interfaces: the computing device is virtualized into N virtual computing devices; and the ROM stores firmware, where the firmware includes a physical function and N virtual functions. The physical function is used to configure the PCIe: N virtual functions are managed by the physical function, and each virtual function corresponds to a virtual interface. Each operating system accesses a virtual computing device through a virtual interface to perform a task of that operating system.

A second aspect of the present disclosure provides a board card including the above-mentioned machine learning device.

A third aspect of the present disclosure provides a virtualization method based on an on-chip system, where the on-chip system is connected to a user space that carries N operating systems, where N is a positive integer.

The virtualization method includes: virtualizing a PCIe of the on-chip system to generate at least N virtual interfaces: virtualizing a computing device of the on-chip system to generate N virtual computing devices; virtualizing a physical function of the on-chip system to generate N virtual functions: configuring one of those virtual interfaces to each operating system: configuring one of those virtual computing devices to an operating system; and configuring one of those virtual functions to the operating system.

A fourth aspect of the present disclosure provides a computer-readable storage medium, on which a computer program code for virtualization based on an on-chip system is stored. The above-mentioned method is executed when the computer program code is run by the processor.

The virtualization technology provided in the present disclosure divides resources of the on-chip system into a plurality of virtual components for simultaneous use by a plurality of virtual machines in a user space, providing excellent resource sharing and parallelism, isolation, configuration flexibility, and security. 2020101314853

2020101315019 In order to at least partially solve the technical problems mentioned in the background, solutions of the present disclosure provide a method, a device, a board card, and a computer-readable storage medium for virtualizing a computer framework.

A first aspect of the present disclosure provides a machine learning device connected to a user space that carries N operating systems, where N is a positive integer. The machine learning device includes a PCIe, a video encoding and decoding device, a JPEG (Joint Photographic Experts Group) encoding and decoding device, and an ROM. The PCIe is virtualized into at least N virtual interfaces: the video encoding and decoding device is virtualized into N virtual video encoding and decoding devices: the JPEG encoding and decoding device is virtualized into N virtual JPEG encoding and decoding devices; and the ROM stores firmware, where the firmware includes a physical function and N virtual functions. The physical function is used to configure the PCIe: N virtual functions are managed by the physical function, and each virtual function corresponds to a virtual interface. Each operating system accesses a virtual video encoding and decoding device and a virtual JPEG encoding and decoding device through a virtual interface and a virtual function to perform a task of that operating system.

A second aspect of the present disclosure provides a board card including the above-mentioned machine learning device.

A third aspect of the present disclosure provides a virtualization method based on an on-chip system, where the on-chip system is connected to a user space that carries N operating systems, where N is a positive integer. The virtualization method includes: virtualizing the PCIe of the on-chip system to generate at least N virtual interfaces: virtualizing the video encoding and decoding device of the on-chip system to generate N virtual video encoding and decoding devices: virtualizing the JPEG encoding and decoding device of the on-chip system to generate N virtual JPEG encoding and decoding devices: virtualizing the physical function of the on-chip system to generate N virtual functions: configuring one of those virtual interfaces to each operating system: configuring one of those virtual video encoding and decoding devices to that operating system: configuring one of those virtual JPEG encoding and decoding devices to that operating system; and configuring one of those virtual functions to that operating system.

A fourth aspect of the present disclosure provides a computer-readable storage medium, on which a computer program code for virtualization based on an on-chip system is stored. The above-mentioned method is executed when the computer program code is run by the processor.

The virtualization technology provided in the present disclosure divides resources of the on-chip system into a plurality of virtual components for simultaneous use by a plurality of virtual machines in a user space, providing excellent resource sharing and parallelism, isolation, configuration flexibility, and security. 2020101315019

202010130697X In order to at least partially solve the technical problems mentioned in the background, solutions of the present disclosure provide a method, a device, a board card, and a computer-readable storage medium for virtualizing a computer framework.

A first aspect of the present disclosure provides a machine learning device connected to a user space that carries N operating systems, where N is a positive integer. The machine learning device includes a PCIe, a storage device, and an ROM. The PCIe is virtualized into at least N virtual interfaces: the storage device is virtualized into N virtual storage devices; and the ROM stores firmware, where the firmware includes a physical function and N virtual functions. The physical function is used to configure the PCIe: N virtual functions are managed by the physical function, and each virtual function corresponds to a virtual interface. Each operating system accesses a virtual storage device through a virtual interface to perform a task of that operating system.

A second aspect of the present disclosure provides a board card including the above-mentioned machine learning device.

A third aspect of the present disclosure provides a virtualization method based on an on-chip system, where the on-chip system is connected to a user space that carries N operating systems, where N is a positive integer. The virtualization method includes: virtualizing the PCIe of the on-chip system to generate at least N virtual interfaces: virtualizing the storage device of the on-chip system to generate N virtual storage devices: virtualizing the physical function of the on-chip system to generate N virtual functions: configuring one of those virtual interfaces to each operating system: configuring one of those virtual storage devices to that operating system; and configuring one of those virtual functions to that operating system.

A fourth aspect of the present disclosure provides a computer-readable storage medium, on which a computer program code for virtualization based on an on-chip system is stored. The above-mentioned method is executed when the computer program code is run by the processor.

The virtualization technology provided in the present disclosure divides resources of the on-chip system into a plurality of virtual components for simultaneous use by a plurality of virtual machines in a user space, providing excellent resource sharing and parallelism, isolation, configuration flexibility, and security. 202010130697X 2020101307135 In order to at least partially solve the technical problems mentioned in the background, solutions of the present disclosure provide a method, a device, a board card, and a computer-readable storage medium for virtualizing a computer framework.

A first aspect of the present disclosure provides a neural network computing device, which is virtualized as N virtual computing devices. The neural network computing device includes M clusters configured to each virtual computing device. M and N are positive integers, and M is not less than N.

A second aspect of the present disclosure provides an integrated circuit device including the above-mentioned neural network computing device.

A third aspect of the present disclosure provides a board card including the above-mentioned integrated circuit device.

A fourth aspect of the present disclosure provides a virtualization method based on a neural network computing device, where the neural network computing device includes M clusters and receives a task from a user space, which includes N operating systems. The virtualization method includes: virtualizing the neural network computing device to generate N virtual computing devices: configuring at least one of those clusters to each virtual computing device; and configuring one of those virtual computing devices to each operating system: where M and N are positive integers, and M is not less than N.

A fifth aspect of the present disclosure provides a computer-readable storage medium, on which a computer program code for virtualization based on a neural network computing device is stored. The above-mentioned method is executed when the computer program code is run by the processor.

The virtualization technology provided in the present disclosure divides resources of the on-chip system into a plurality of virtual components for simultaneous use by a plurality of virtual machines in a user space, providing excellent resource sharing and parallelism, isolation, configuration flexibility, and security. 2020101307135

2020111771747 In order to at least partially solve the technical problems mentioned in the background, solutions of the present disclosure provide a virtualization on-chip system and a board card.

A first aspect of the present disclosure provides an on-chip system including: a virtual computing device configured to perform convolution computation of a neural network: a virtual video encoding and decoding device configured to perform video encoding and decoding: a virtual JPEG encoding and decoding device configured to perform JPEG encoding and decoding; and a virtual storage device configured to store data.

A second aspect of the present disclosure provides a board card including the above-mentioned on-chip system.

The virtualization technology provided in the present disclosure divides resources of the on-chip system into a plurality of virtual components for simultaneous use by a plurality of virtual machines in a user space, providing excellent resource sharing and parallelism, isolation, configuration flexibility, and security. 2020111771747

2020111772078 In order to at least partially solve the technical problems mentioned in the background, solutions of the present disclosure provide a virtualization on-chip system and a board card.

A first aspect of the present disclosure provides a machine learning device including N virtual components and M units, where N and M are positive integers, and M is greater than N. Each virtual component is configured with at least one unit to perform a task of the virtual component.

A second aspect of the present disclosure provides a board card including the above-mentioned machine learning device.

The virtualization technology provided in the present disclosure divides resources of the on-chip system into a plurality of virtual components for simultaneous use by a plurality of virtual machines in a user space, providing excellent resource sharing and parallelism, isolation, configuration flexibility, and security. 2020111772078

BRIEF DESCRIPTION OF THE DRAWINGS

By reading the following detailed description with reference to the accompanying drawings, the above-mentioned and other objects, features and technical effects of the exemplary embodiments of the present disclosure will become easier to understand. In the accompanying drawings, several embodiments of the present disclosure are shown in an exemplary but not restrictive manner, and the same or corresponding reference numerals indicate the same or corresponding parts of the embodiments.

FIG. 3 is a schematic diagram illustrating flexible allocating cluster manners of an embodiment of the present disclosure:

FIG. 4 is a schematic diagram of a board card of an embodiment of the present disclosure:

FIG. 5 is a flowchart illustrating virtualization for a user space of an embodiment of the present disclosure:

FIG. 6 is a flowchart illustrating virtualization for an on-chip system of an embodiment of the present disclosure; and FIG. 7 is a flowchart illustrating virtualization for a computing device of an embodiment of the present disclosure.

DETAILED DESCRIPTION OF THE EMBODIMENTS

Figure 1:
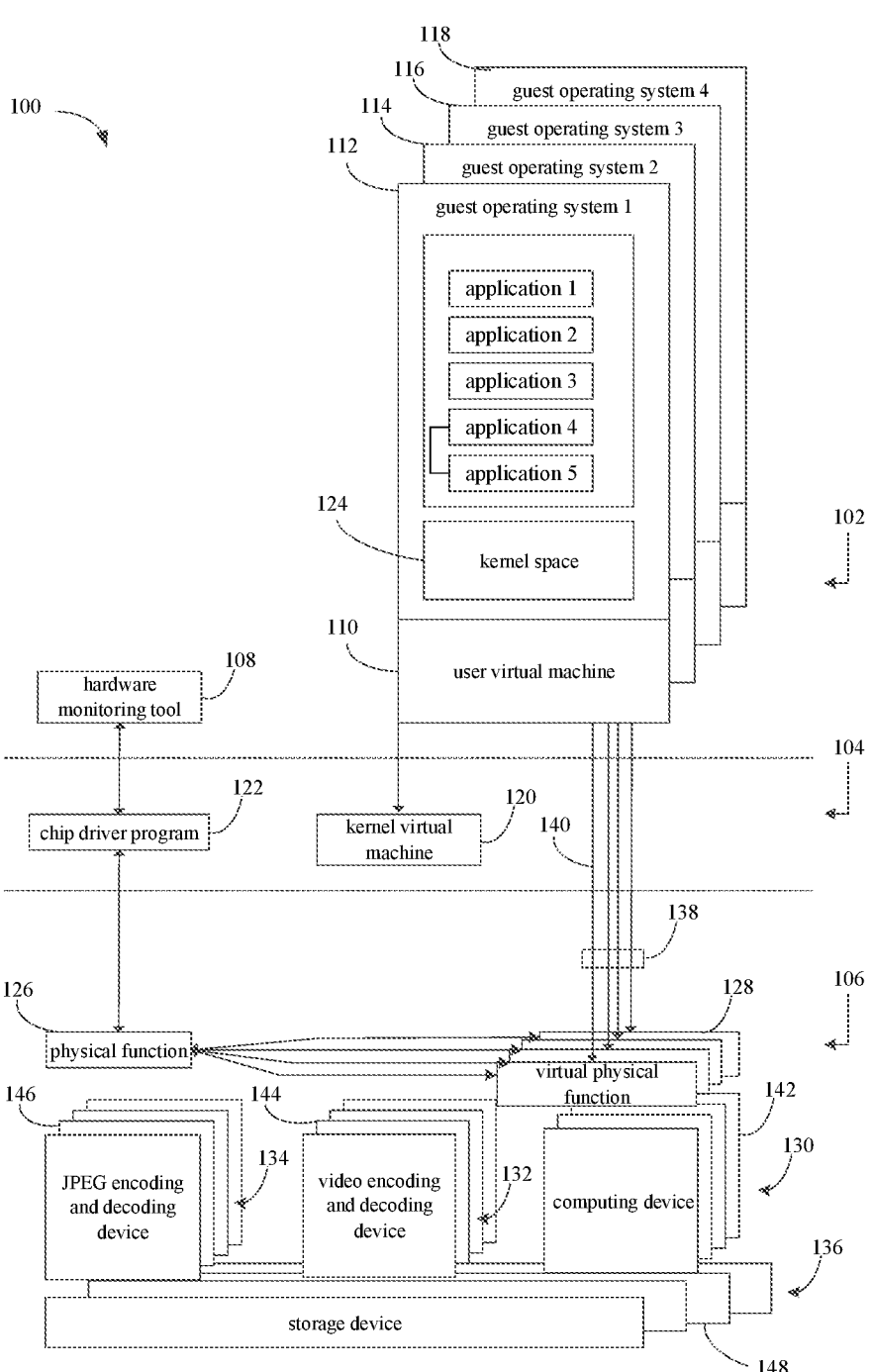
FIG. 1 is a structural block diagram illustrating an embodiment of the present disclosure.

Technical solutions in embodiments of the present disclosure will be described clearly and completely hereinafter with reference to the drawings in the embodiments of the present disclosure. The embodiments to be described are merely some rather than all embodiments of the present disclosure. All other examples obtained by those skilled in the art based on the embodiments of the present disclosure without creative efforts shall fall within the protection scope of the present disclosure.

It should be understood that terms such as "first", "second", "third", and "fourth" in the claims, the specification, and drawings are used for distinguishing different objects rather than describing a specific order. It should be understood that the terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely intended to describe specific embodiments rather than to limit the present disclosure. As being used in the specification and the claims of the disclosure, unless the context clearly indicates otherwise, the singular forms "a", "an", and "the" are intended to include the plural forms. It should also be understood that the term "and/or" used in the specification and the claims refers to any and all possible combinations of one or more of relevant listed items and includes these combinations.

As being used in this specification and the claims, the term "if" can be interpreted as "when", or "once", or "in response to a determination" or "in response to a case where something is detected" depending on the context.

The specific embodiments of the present disclosure are described in details below in reference to the drawings.

Virtualization is a technology virtualizing a computer device to a plurality of virtual machines. When the plurality of virtual machines are running on one computer at the same time, each virtual machine may run different operating systems. Applications running on the operating systems may run in separate spaces without affecting each other, thus significantly increasing the efficiency of the computer.

The virtualization technology is different from a multi-task or hyper-threading technology. The multi-task refers to running a plurality of programs in one operating system at the same time. However, in the virtualization technology, the plurality of operating systems may be run at the same time, and each of the operating system contains a plurality of running programs, and each of the operating system is running on a corresponding virtual machine. The hyper-threading technology refers to a technology that a uniprocessor simulates a dual processor to balance the operating performance of a program. These two simulated processors may not be separated, but may only work together. However, in the virtualization technology, a virtual processor or component may work independently.

The virtualization technology usually uses software to redefine and divide physical resource of the computer, so as to realize dynamic allocation and flexible schedule of the computer resource, thereby improving resource utilization.

Descriptions of hardware, software, and firmware will be involved in the present disclosure. Hardware includes various devices, units, apparatuses, equipment, and the like: software includes various operating systems, machines, programs, tools, and the like; and firmware includes functions, and the like. When referring to hardware, software, and firmware, they are described as components. Such an arrangement is intended only to describe the technology of the present disclosure more clearly and is not intended to limit the technology of the present disclosure in any way.

An embodiment of the present disclosure is a framework using virtualization technology, and is applied to an artificial intelligence chip. In more detail, the framework is used on a machine learning device for a neural network, where the machine learning device may be a convolutional neural network accelerator. FIG. 1 is a framework diagram of artificial intelligence chip virtualization. A framework 100 includes a user space 102, a kernel space 104, and an on-chip system 106, which are separated by dashed lines on the figure. The user space 102 is a runtime space for a user program, which only performs simple operations and cannot call system resources directly. The user space 102 must pass through a system interface to issue an instruction to a kernel. The kernel space 104 is a space where kernel code runs. The kernel space 104 may execute any instruction and call all resources of a system. The on-chip system 106 is units of the artificial intelligence chip, and may collaborate with the user space 102 through the kernel space 104.

In the embodiment, to make a better distinction, hardware of the user space 102 is uniformly referred to as apparatus or equipment, and hardware of the on-chip system 106 is uniformly referred to as device or unit. Such an arrangement is intended only to describe the technology of the embodiment more clearly and is not intended to limit the technology of the present disclosure in any way.

Unless otherwise emphasized, this embodiment is illustrated by the example of virtualizing one component into four virtual components. The present disclosure does not limit the number of virtual components.

Before operating virtualization, the user space 102 is controlled by a hardware monitoring tool 108, and may obtain information of the on-chip system 106 through the call interface. The hardware monitoring tool 108 may not only collect information of the on-chip system 106, but may obtain resource overhead on the on-chip system 106 by upper software in real time, providing real-time detailed information and state of the current on-chip system 106 to the users. These detailed information and state may be dozens of types of data such as a software device model, a firmware version number, a driver version number, a device utilization, a storage device overhead state, a board card power consumption, a board card peak power consumption and a peripheral component interconnect express (PCIe). Because of different versions and usage scenarios of the hardware monitoring tool 108, content and number of the monitored information may be different.

After the system starts virtualization, operations of the user space 102 may be took over by a user virtual machine 110. The user virtual machine 110 is abstraction and simulation of the real computation environment. The system may allocate a set of data structure to manage a state of the user virtual machine 110. The set of data structure includes a complete set of register, service condition of the physical memory, and the state of the virtual device, and the like. The physical space of the user space 102 of the embodiment is virtualized to four virtual spaces 112, 114, 116 and 118. These four virtual spaces are independent and will not influence each other, and may respectively carry different guest operating systems, such as a guest operating system 1, a guest operating system 2, a guest operating system 3 and a guest operating system 4 shown in the figure. The guest operating system may be Windows, Linus, Unix, iOS, and Android, and different applications may be operated on different operating systems.

In this embodiment, the user virtual machine 110 is implemented through a quick emulator (QEMU). QEMU is an open source virtualization software programmed in C language, and may virtualize the interface through dynamic binary, and provide a series of hardware models to make the guest operating system 1, the guest operating system 2, the guest operating system 3 and the guest operating system 4 directly visit the on-chip system 106. The user space 102 may include a processor, a memory, an I/O device and the like. The QEMU may virtualize the processor of the user space 102 to four virtual processors, and virtualize the memory to four virtual memories, and may also virtualize the I/O device to four virtual I/O devices. Each guest operating system may take part of the resource of the user space 102. For example, taking a quarter of the resources of the user space means that each guest operating system may respectively access a virtual processor, a virtual memory, and a virtual I/O device to perform a task of the guest operating system. Through this mode, the guest operating system 1, the guest operating system 2, the guest operating system 3 and the guest operating system 4 may operate independently.

The kernel space 104 carries a kernel virtual machine 120 and a chip driver program 122. The kernel virtual machine 120 is matched with the QEMU, and the main responsibility is to virtualize the kernel space 104 and the on-chip system 106 to make each guest operating system has its own address space when accessing the on-chip system 106. Particularly, space on the on-chip system 106 mapped to the guest operating system is a virtual component mapped to the process.

From the perspective of the user virtual machine 110, during the operation of the virtual machine, the QEMU calls the interface for kernel setup through the system provided by the kernel virtual machine 120. The QEMU uses the virtualization function of the kernel virtual machine 120, providing hardware virtualization acceleration for the virtual machine of the QEMU to improve the performance of the virtual machine. From the perspective of the kernel virtual machine 120, when the user may not directly interact with the kernel space 104, the manage tool of the user space 102 is required, so that the QEMU, a tool operating in the user space 102, may be required.

A chip driver program 122 is configured to drive a physical function (PF) 126. During the operation of the virtual machine, the user space 102 does not use the hardware monitor tool 108, but uses the chip drive program 122 to access the on-chip system 106. Therefore, the guest operating system 1, the guest operating system 2, the guest operating system 3 and the guest operating system 4 are respectively configured with the kernel space 124 to be loaded with the chip driver program 122, which enables each guest operating system drive the on-chip system 106.

The on-chip system 106 performs virtualization through the SR-IOV (single root I/O virtualization) technology. In particular, the SR-IOV technology may be able to virtualize each component of the on-chip system 106. The SR-IOV technology is a hardware-based virtualization solution that allows efficient sharing of PCIe resources among virtual machines. The SR-IOV technology enables resources of a single PCIe to be shared by a plurality of virtual components of the on-chip system 106, providing dedicated resources for those virtual components. Therefore, each virtual component may has its corresponding unique accessible resource.

The on-chip system 106 of the embodiment includes hardware and firmware. The hardware includes an ROM (read only memory) that is not shown in the figure, and the ROM is configured to store the firmware. The firmware includes the physical function 126 to support or cooperate with the PCIe function of the SR-IOV, and the physical function 126 has the power to fully configure the PCIe resource. When implementing the SR-IOV technology, the physical function 126 may generate a plurality of virtual functions (VF) 128 through virtualization, and there are four virtual functions 128 in this embodiment. The virtual function 128 is a lightweight PCIe function that is managed by the physical function 126, and may share the PCIe physical resource with the physical function 126 and other virtual functions 128 related to the same physical function 126. The virtual function 128 is only allowed to control the resource allocated by the physical function 126 to the virtual function 128.

Once the SR-IOV is enabled in the physical function 126, each virtual function 128 may access its own PCIe configuration space through its bus, device and function number. Each virtual function 128 may have one memory space configured to map a register set of the virtual function 128. A driver program of the virtual function 128 performs an operation on the register set to enable the function of the register set, and the function may be directly designated to the corresponding user virtual machine 110. Even the function 128 is virtual, the user virtual machine 110 may consider 128 as a real PCIe device.

Hardware of the on-chip system 106 also includes a computing device 130, a video encoding and decoding device 132, a JPEG encoding and decoding device 134, a storage device 136, and a PCIe 138. In this embodiment, the computing device 130 is an IPU (intelligent processing unit) configured to execute convolution computation of the neural network: the video encoding and decoding device 132 is configured to encode and decode the video data: the JPEG encoding and decoding device 134 is configured to encode and decode static pictures that adopt the JPEG algorithm: the storage device 136 may be a DRAM (Dynamic Random Access Memory) configured to store data; and the PCIe 138 is the above mentioned PCIe. During the operation of the virtual machine, the PCIe 138 may be virtualized to four virtual interfaces 140. The virtual function 128 has one to one correspondence with the virtual interface 140; in other words, the first virtual function corresponds to the first virtual interface, the second virtual function corresponds to the second virtual interface, and the like.

Through the SR-IOV technology, the computing device 130 may be virtualized to four virtual computing devices 142, the video encoding and decoding device 132 may be virtualized to four virtual video encoding and decoding devices 144, the JPEG encoding and decoding device 134 may be virtualized to four virtual JPEG encoding and decoding devices 146, and the storage device 136 may be virtualized to four virtual storage devices 148.

Each guest operating system is configured with a set of virtual suite, and each set of the virtual suite includes a user virtual machine 110, a virtual interface 140, a virtual function 128, a virtual computing device 142, a virtual video encoding and decoding device 144, a virtual JPEG encoding and decoding device 146 and a virtual storage device 148. Each set of the virtual suite may operate independently without affecting each other, and the virtual suite is configured to perform a delivered task from the corresponding guest operating system, so as to make sure that each guest operating system may access the configured virtual computing device 142, the virtual video encoding and decoding device 144, the virtual JPEG encoding and decoding device 146 and the virtual storage device 148 through the configured virtual interface 140 and the virtual function 128.

Specifically, when performing tasks, each guest operating system may access different hardware in response to different tasks. For example, if one task is to perform matrix convolution computation, the guest operating system may access the configured virtual computing device 142 through the configured virtual interface 140 and the virtual function 128: if one task is to perform video encoding and decoding, the guest operating system may access the configured virtual video encoding and decoding device 144 through the configured virtual interface 140 and the virtual function 128; if one task is to perform JPEG encoding and decoding, the guest operating system may access the configured virtual JPEG encoding and decoding device 146 through the configured virtual interface 140 and the virtual function 128; and if one task is to read or write data, the guest operating system may access the configured virtual storage device 148 through the configured virtual interface 140 and the virtual function 128.

Figure 2:
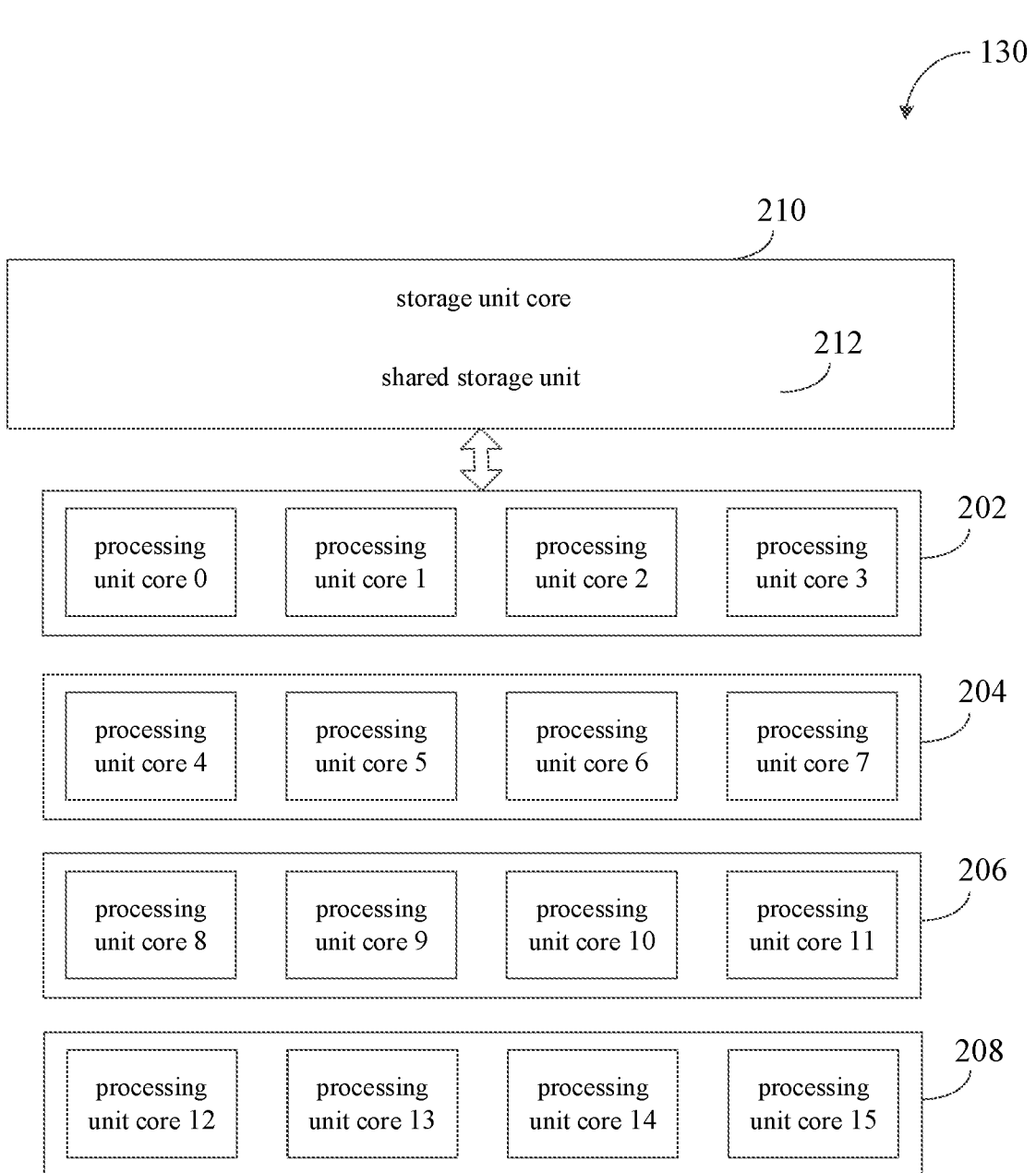
FIG. 2 is a schematic diagram illustrating an internal structure of a computing device of an embodiment of the present disclosure.

FIG. 2 illustrates an internal structure of a computing device 130. The computing device 130 has a total of 16 processing unit cores (a processing unit core 0 to a processing unit core 15) for performing a matrix computing task, with every 4 processing unit cores forming a processing unit group, also known as a cluster. In more detail, a processing unit core 0 to a processing unit core 3 form a first cluster 202, a processing unit core 4 to a processing unit core 7 form a second cluster 204, a processing unit core 8 to a processing unit core 11 form a third cluster 206, and a processing unit core 12 to a processing unit core 15 form a fourth cluster 208. The computing device 130 essentially performs computing tasks in clusters.

The computing device 130 also includes a storage unit core 210 and a shared storage unit 212. The storage unit core 210 is primarily configured to control the data exchange and serves as a channel for communication between the computing device 130 and the storage device 136. The shared storage unit 212 is configured to temporarily store computed intermediate values of these clusters 202, 204, 206, 208. During the virtualization operation, the storage unit core 210 is divided into four virtual storage unit cores, and the shared storage unit 212 is similarly divided into four virtual shared storage units.

Each virtual computing device 142 is configured with one virtual storage unit core, one virtual shared storage unit, and one cluster, respectively, to support a task of a specific guest operating system. Likewise, each virtual computing device 142 operates independently without affecting each other.

The computing device 130 may perform flexible allocation in clusters based on the number of virtual components and the required resources. FIG. 3 is a schematic diagram illustrating flexible allocating cluster manners. A first exemplary allocation manner 302 is: in the case where there are four virtual computing devices 142, configuring a cluster to each virtual computing device 142. A second exemplary allocation manner 304 is: in a case where there are three virtual computing devices 142 and a first virtual computing device requires more hardware resources, configuring two clusters to the first virtual computing device, and configuring one cluster to a second virtual computing device and a third virtual computing device, respectively. A third exemplary allocation manner 306 is: in a case where there are two virtual computing devices 142, and the two virtual computing devices 142 equally share cluster resources, configuring two clusters to each of the two virtual computing devices 142. A fourth exemplary allocation manner 308 is: in a case where there are two virtual computing devices 142, and the first virtual computing device requires more hardware resources, configuring three clusters to the first virtual computing device, and configuring one cluster to the second virtual computing device.

The number of clusters of the computing device 130 should be at least as many as the number of virtual computing devices 142 to ensure that each virtual computing device 142 may be configured with one cluster. When the number of clusters of the computing device 130 is more than the number of virtual computing devices 142, the clusters may be appropriately configured to virtual computing devices 142 according to the actual demand to increase the hardware configuration flexibility.

The video encoding and decoding device 132 of this embodiment includes 6 video encoding and decoding units. The video encoding and decoding device 132 may perform flexible allocation in video encoding and decoding units based on the number of virtual components and the required resources. For example, the video encoding and decoding device 132 is virtualized to four virtual video encoding and decoding devices 144. It is assumed that a first virtual video encoding and decoding device and a second virtual video encoding and decoding device require more video encoding and decoding resources, two video encoding and decoding units may be configured to the first virtual video encoding and decoding device and the second virtual video encoding and decoding device, respectively, and one video encoding and decoding unit may be configured to each of the other virtual video encoding and decoding devices 144, respectively. For another example, the video encoding and decoding device 132 is virtualized to three virtual video encoding and decoding devices 144, in a case where neither of the virtual video encoding and decoding devices requires more video encoding and decoding resources, two video encoding and decoding units may be configured to each of the virtual video encoding and decoding devices 144, respectively.

The number of video encoding and decoding units should be at least as many as the number of virtual video encoding and decoding devices 144 to ensure that each virtual video encoding and decoding device 144 may be configured with one video encoding and decoding unit. When the number of video encoding and decoding units is more than the number of virtual video encoding and decoding devices 144, the video encoding and decoding units may be appropriately configured to video encoding and decoding devices 144 according to the actual demand to increase the hardware configuration flexibility.

Similarly, the JPEG encoding and decoding device 134 of this embodiment includes 6 JPEG encoding and decoding units. The JPEG encoding and decoding device 134 may perform flexible allocation in JPEG encoding and decoding units based on the number of virtual components and the required resources. The allocation manner is no different from the allocation manner of the video encoding and decoding device 132, so it is not repeated herein.

The storage device 136 may adopt an NUMA (non-uniform memory access) architecture, which includes a plurality of DDR (Double Data Rate) channels. The storage device 136 may perform flexible allocation in DDR channels based on the number of virtual components and the required resources. The allocation manner is no different from that of the computing device 130, the video encoding and decoding device 132 and the JPEG encoding and decoding device 134, so it is not repeated herein.

The preceding embodiment is configured on the premise that each component of the system is divided into the same number of virtual components. In some special scenarios, the number of virtual components of each component may be inconsistent.

Another embodiment of the present disclosure also adopts the framework shown in FIG. 1 and differs from the previous embodiment in that the PCIe 138 is virtualized into six virtual interfaces 140, and other components maintain four virtual components. In this embodiment, the system will take the minimum number of virtual components among all components as the basis for virtualization operation, in other words, the minimum number of virtual components is four. In this case, the PCIe 138 may have two idle virtual interfaces 140, and the QEMU may choose to turn off or not configure these two idle virtual interfaces 140, or include these two virtual interfaces 140 into the virtualization operation. For example, if a first virtual function and a second virtual function require more interface resources, the QEMU may configure two virtual interfaces 140 to the first virtual function and the second virtual function, respectively, and one virtual interface to the other virtual function, respectively.

An embodiment of the present disclosure also provides a board card including the framework shown in FIG. 1. As shown in FIG. 4, a board card 400 includes at least one chip 402 (only two chips 402 are shown in the figure), a storage device 404, an interface device 406, and a control apparatus 408.

The chip 402 shown in FIG. 4 integrates the computing device 130, the video encoding and decoding device 132 and the JPEG encoding and decoding device 143 shown in FIG. 1, and the like, and may be in different working states such as a multi-load working state and a light-load working state. The control device 408 enables the regulation of the working state of the computing device 130, the video encoding and decoding device 132 and the JPEG encoding and decoding device 143 in the chip 402.

The storage device 404 is connected to the chip 402 through a bus 414, and is configured to store data. The storage device 404 is the storage device 136 shown in FIG. 1, which includes a plurality of DDR channels 410, as previously described. Each group of DDR channel 410 may include a plurality of DDR4 particles (chips). Each group of DDR channels 410 is connected to the chip 402 via the bus 414.

The interface device 406 is the PCIe 138 shown in FIG. 1, and is electrically connected to the chip 402 within the chip package structure. The interface device 406 is configured to implement data transfer between the chip 402 and an external device 412 (the user space 102). A task to be processed is transferred from the external device 412 to the chip 402 via the PCIe interface, thereby realizing data transfer. The interface device 406 may also be other interfaces, and the present disclosure does not limit a specific form of the interface as long as the interface can achieve the virtualization function. In addition, a computation result of the chip 402 may also be transferred by the interface device 406 to the external device 412.

The control apparatus 408 is the kernel space 104 shown in FIG. 1, and is electrically connected to the chip 402 so as to monitor the status of the chip 402. Specifically, the chips 402 and the control component 408 can be electrically connected through an SPI interface. The control apparatus 408 may include an MCU (micro controller unit), and store a kernel virtual machine 120 and a chip driver 122.

The present disclosure further provides an electronic apparatus or device including the board card 400. According to different application scenarios, the electronic apparatus or device may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device. The vehicle includes an airplane, a ship, and/or a car: the household electrical appliance may include a television, an air conditioner, a microwave oven, a refrigerator, an electric rice cooker, a humidifier, a washing machine, an electric lamp, a gas cooker, and a range hood; and the medical equipment may include a nuclear magnetic resonance spectrometer, a B-ultrasonic scanner, and/or an electrocardiogra.

Another embodiment of the present disclosure is a virtualization method, and more specifically, a virtualization method for the framework 100 shown in FIG. 1. It is used on a machine learning device for a neural network, where the machine learning device may be a convolutional neural network accelerator.

Before being virtualized, the user space 102 is controlled by a hardware monitoring tool 108, and may obtain information of the on-chip system 106 through a call interface. The hardware monitoring tool 108 may not only collect information of the on-chip system 106, but may obtain resource overhead on the on-chip system 106 by upper software in real time, providing real-time detailed information and state of the current on-chip system 106 to the user space 102.

FIG. 5 is a flowchart illustrating virtualization for a user space 102.

During the virtualization operation, the user space 102 may be took over by the user virtual machine 110. The user virtual machine 110 is abstraction and simulation of the real computation environment. The system may allocate a set of data structure to manage a state of the user virtual machine 110. The set of data structure includes a complete set of register, service condition of the physical memory, and the state of the virtual device, and the like. The user virtual machine 110 is implemented through the QEMU. The user space 102 includes a processor, a memory, an I/O device, and the like.

When a step 502 is executed, the QEMU virtualizes a processor of the user space 102 to generate four virtual processors. When a step 504 is executed, the QEMU virtualizes a memory of the user space 102 to generate four virtual memories. When a step 506 is executed, the QEMU virtualizes an I/O device of the user space 102 to generate four virtual I/O devices.

When a step 508 is executed, the QEMU allocates one of these virtual processors to each guest operating system individually. When a step 510 is executed, the QEMU allocates one of these virtual memories to each guest operating system individually. When a step 512 is executed, the QEMU allocates one of these virtual I/O devices to each guest operating system individually.

After the foregoing steps are executed, each guest operating system occupies a part of the resource of the user space 102, for example, each guest operating system occupies a quarter resource of the user space 102. In more detail, each guest operating system may access a virtual processor, a virtual memory and a virtual I/O device to perform a tasks of the guest operating system. Through this mode, the guest operating system 1, the guest operating system 2, the guest operating system 3 and the guest operating system 4 may operate independently.

Firmware of the on-chip system 106 includes a physical function 126. Hardware of the on-chip system 106 includes a computing device 130, a video encoding and decoding device 132, a JPEG encoding and decoding device 134, a storage device 136, and a PCIe 138. In the SR-IOV environment, the virtualization of the on-chip system 106 is implemented based on the SR-IOV technology, and the flow is shown in FIG. 6.

When a step 602 is executed, the PCIe 138 is virtualized to generate at least four virtual interfaces 140. When a step 604 is executed, the physical function 126 is virtualized to generate four virtual physical functions 128. When a step 606 is executed, the computing device 130 is virtualized to generate four virtual computing devices 142.

When a step 608 is executed, the video encoding and decoding device 132 is virtualized to generate four virtual encoding and decoding devices 144. In more detail, the video encoding and decoding device 132 in this embodiment includes six video encoding and decoding units, one of which may be configured to each of the virtual video encoding and decoding devices 144. The video encoding and decoding device 132 may perform flexible allocation in video encoding and decoding units based on the number of virtual components and the required resources. The number of video encoding and decoding units should be at least as many as the number of virtual video encoding and decoding devices 144 to ensure that each virtual video encoding and decoding device 144 may be configured with one video encoding and decoding unit. When the number of video encoding and decoding units is more than the number of virtual video encoding and decoding devices 144, then the video encoding and decoding units may be appropriately configured to video encoding and decoding devices 144 according to the actual demand to increase the hardware configuration flexibility.

When a step 610 is executed, the JPEG encoding and decoding device 134 is virtualized to generate four virtual JPEG encoding and decoding devices 146. In more detail, the JPEG encoding and decoding device 134 in this embodiment includes six JPEG encoding and decoding units, one of which may be configured to each of the virtual JPEG encoding and decoding devices 146. The JPEG encoding and decoding device 134 may perform flexible allocation in JPEG encoding and decoding units based on the number of virtual components and the required resources. The number of JPEG encoding and decoding units should be at least as many as the number of virtual JPEG encoding and decoding devices 146 to ensure that each virtual JPEG encoding and decoding device 146 may be configured with one JPEG encoding and decoding unit. When the number of JPEG encoding and decoding units is more than the number of virtual JPEG encoding and decoding devices 146, the JPEG encoding and decoding units may be appropriately configured to the JPEG encoding and decoding devices 146 according to the actual demand to increase the hardware configuration flexibility.

When a step 612 is executed, the storage device 136 is virtualized to generate four virtual storage devices 148. In this step, at least one of the DDR channels in the storage device 136 is configured for each virtual storage device. Similarly, the storage device 136 may perform flexible allocation in DDR channels based on the number of virtual components and the required resources.

When a step 614 is executed, one of these virtual interfaces 140 is configured to each guest operating system. When a step 616 is executed, one of these virtual functions 128 is configured to each guest operating system. When a step 618 is executed, one of these virtual computing devices 142 is configured to each guest operating system. When a step 620 is executed, one of these virtual video encoding and decoding devices 144 is configured to each guest operating system. When a step 622 is executed, one of these virtual JPEG encoding and decoding devices 146 is configured to each guest operating system. When a step 624 is executed, one of these virtual storage devices 148 is configured to each guest operating system.

After the steps in FIG. 5 and FIG. 6 are executed, each guest operating system is configured with a set of virtual suite, and each set of the virtual suite includes a processor, a memory, a user virtual machine 110, a virtual interface 140, a virtual function 128, a virtual computing device 142, a virtual video encoding and decoding device 144, a virtual JPEG encoding and decoding device 146 and a virtual storage device 148. Each set of the virtual suite may operate independently without affecting each other, and the virtual suite is configured to perform a delivered task from the corresponding guest operating system, so as to make sure that each guest operating system may access the configured virtual computing device 142, the virtual video encoding and decoding device 144, the virtual JPEG encoding and decoding device 146 and the virtual storage device 148 through the configured virtual interface 140 and the virtual function 128.

FIG. 7 is a flowchart illustrating virtualization for a computing device 130 based on the SR-IOV technology. The computing device 130 has a total of 16 processing unit cores (a processing unit core 0 to a processing unit core 15) for performing a matrix computing task.

When a step 702 is executed, every four processing unit cores are grouped into a cluster. The computing device 130 essentially performs computing tasks in clusters.

The computing device 130 also includes a storage unit core 210 and a shared storage unit 212. When a step 704 is executed, the storage unit core 210 is virtualized to generate four virtual storage unit cores. When a step 706 is executed, the shared storage unit 212 is virtualized to generate four virtual shared storage units. When a step 708 is executed, one of these clusters is configured to the virtual computing device 142. When a step 710 is executed, one of these virtual storage unit cores is configured to the virtual computing device 142. When a step 712 is executed, one of these virtual shared storage units is configured to the virtual computing device 142.

In more detail, when the step 708 is executed, the computing device 130 may perform flexible allocation in clusters based on the number of virtual components and the required resources. The number of clusters of the computing device 130 should be at least as many as the number of virtual computing devices 142 to ensure that each virtual computing device 142 may be configured with one cluster. When the number of clusters of the computing device 130 is more than the number of virtual computing devices 142, then the clusters may be appropriately configured to virtual computing devices 142 according to the actual demand to increase the hardware configuration flexibility.

After the steps in FIG. 7 are executed, each virtual computing device 142 is configured with one virtual storage unit core, one virtual shared storage unit, and one cluster, respectively, to support a computing task of a specific guest operating system. Likewise, each virtual computing device 142 operates independently without affecting each other.

Another embodiment of the present disclosure provides a computer-readable storage medium, on which computer program code for virtualization based on a machine learning device is stored. When the computer program code is run by the processor, the method of the above-mentioned embodiment may be executed, such as the technical solutions shown in FIG. 5, FIG. 6, and FIG. 7.

The virtualization technology provided in the present disclosure is based on the SR-IOV technology and divides resources of the on-chip system into a plurality of virtual components for simultaneous use by a plurality of virtual machines in a user space. This technology completely divides hardware resources (computing and storage resources, and the like) instead of a time-slice-based sharing mechanism, thus avoiding the problems of service quality and head-of-line blocking caused by time-slice scheduling, while providing excellent resource sharing and parallelism, isolation, configuration flexibility and security.

The foregoing can be better understood according to the following articles:

2020101314853 A1. A machine learning device connected to a user space that carries N operating systems, where N is a positive integer, and the machine learning device includes: a PCIe virtualized into at least N virtual interfaces: a computing device virtualized into N virtual computing devices; and an ROM with firmware stored, where the firmware includes a physical function used to configure the PCIe and N virtual functions managed by the physical function, and each virtual function corresponds to a virtual interface, where each operating system accesses a virtual computing device through a virtual interface to perform a task of that operating system.

A2. The machine learning device of A1, where the computing device includes an IPU (intelligent processing unit) configured to execute convolution computation of a neural network.

A3. The machine learning device of A2, where the computing device includes M clusters and M is a positive integer not less than N.

A4. The machine learning device of A3, where each virtual computing device includes at least one cluster.

A5. The machine learning device of A3, where the computing device further includes a shared storage unit configured to temporarily store computed intermediate values of these clusters; and the shared storage unit is virtualized into N virtual shared storage units, where each virtual computing device corresponds to one virtual shared storage unit.

A6. The machine learning device of A1, further comprising: a storage device virtualized into N virtual storage devices, where each operating system accesses a virtual storage device to perform a task of that operating system.

A7. The machine learning device of A6, where the computing device further includes a storage unit core virtualized into N virtual storage unit cores, and each virtual computing device is configured with one virtual storage unit core.

A8. The machine learning device of A1, further comprising: a video encoding and decoding device virtualized into N virtual video encoding and decoding devices, where each operating system accesses a virtual video encoding and decoding device to perform a task of that operating system.

A9. The machine learning device of A1, further comprising: a JPEG encoding and decoding device virtualized into N virtual JPEG encoding and decoding devices, where each operating system accesses a virtual JPEG encoding and decoding device to perform a task of that operating system.

A10. The machine learning device of A1 connected to the user space through a kernel space, where the kernel space carries a kernel virtual machine configured to virtualize the kernel space.

A11. The machine learning device of A10, where the kernel space carries a driver program to drive the physical function.

A12. The machine learning device of A1, where the user space includes a processor and a memory, and the user space carries a user virtual machine to virtualize the processor into N virtual processors and the memory into N virtual memories, where each operating system accesses a virtual processor and a virtual memory to perform a task of the operating system.

A13. The machine learning device of A12, where the user virtual machine is a QEMU.

A14. A board card comprising the machine learning device of any one of A1-13.

A15. A virtualization method based on an on-chip system, where the on-chip system is connected to a user space that carries N operating systems, where N is a positive integer, and the virtualization method includes: virtualizing a PCIe of the on-chip system to generate at least N virtual interfaces; virtualizing a computing device of the on-chip system to generate N virtual computing devices; virtualizing a physical function of the on-chip system to generate N virtual functions; configuring one of those virtual interfaces to each operating system; configuring one of those virtual computing devices to that operating system; and configuring one of those virtual functions to that operating system.

A16. The virtualization method of A15, where virtualizing a computing device of the on-chip system includes: virtualizing the shared storage unit to generate N virtual shared storage units; and configuring one of those virtual shared storage units to the virtual computing device.

A17. The virtualization method of A15, where the virtualizing a computing device of the on-chip system includes: virtualizing the storage unit core to generate N virtual storage unit cores; and configuring one of those virtual storage unit cores to the virtual computing device.

A18. The virtualization method of A15, further comprising: virtualizing a storage device of the on-chip system to generate N virtual storage devices; and configuring one of those virtual storage devices to the operating system.

A19. The virtualization method of A15, further comprising: virtualizing a video encoding and decoding device of the on-chip system to generate N virtual video encoding and decoding devices; and configuring one of those virtual video encoding and decoding devices to the operating system.

A20. The virtualization method of A15, further comprising: virtualizing a JPEG encoding and decoding device of the on-chip system to generate N virtual JPEG encoding and decoding devices; and configuring one of those virtual JPEG encoding and decoding devices to the operating system.

A21. The virtualization method of A15, further comprising: virtualizing a processor of the user space to generate N virtual processors: virtualizing a memory of the user space to generate N virtual memories: configuring one of those virtual processors to the operating system; and configuring one of those virtual memories to the operating system.

A22. A computer-readable storage medium, on which computer program code for virtualization based on an on-chip system is stored, where the method of any one of A15-A21 is executed when the computer program code is run by a processor. 2020101314853

2020101315019 B1. A machine learning device connected to a user space that carries N operating systems, where N is a positive integer, and the machine learning device includes: a PCIe virtualized into at least N virtual interfaces: a video encoding and decoding device virtualized into N virtual video encoding and decoding devices: a JPEG encoding and decoding device virtualized into N virtual JPEG encoding and decoding devices; and an ROM with firmware stored, where the firmware includes a physical function used to configure the PCIe; and N virtual functions managed by the physical function, and each virtual function corresponds to a virtual interface; where each operating system accesses a virtual video encoding and decoding device and a virtual JPEG encoding and decoding device through a virtual interface and a virtual function to perform a task of that operating system.

B2. The machine learning device of B1, where the video encoding and decoding device includes: M video encoding and decoding units configured to these virtual video encoding and decoding devices, where M and N are positive integers and M is not less than N.

B3. The machine learning device of B2, where each virtual video encoding and decoding device includes at least one video encoding and decoding unit.

B4. The machine learning device of B1, where the JPEG encoding and decoding device includes: M JPEG encoding and decoding units configured to these virtual JPEG encoding and decoding devices, where M and N are positive integers and M is not less than N.

B5. The machine learning device of B4, where each virtual JPEG encoding and decoding device includes at least one JPEG encoding and decoding unit.

B6. The machine learning device of B1, further comprising: a computing device virtualized into N virtual computing devices, where each operating system accesses a virtual computing device to perform a task of that operating system.

B7. The machine learning device of B6, where the computing device is an IPU configured to execute convolution computation of a neural network.

B8. The machine learning device of B1, further comprising: a storage device virtualized into N virtual storage devices, where each operating system accesses a virtual storage device to perform a task of that operating system.

B9. The machine learning device of B1 connected to the user space through a kernel space, where the kernel space carries a kernel virtual machine configured to virtualize the kernel space.

B10. The machine learning device of B9, where the kernel space carries a driver program to drive the physical function.

B11. The machine learning device of B1, where the user space includes a processor and a memory, and the user space carries a user virtual machine to virtualize the processor into N virtual processors and the memory into N virtual memories, where each operating system accesses a virtual processor and a virtual memory to perform a task of the operating system.

B12. The machine learning device of B11, where the user virtual machine is a QEMU.

B13. A board card comprising the machine learning device of any one of B1-12.

B14. A virtualization method based on an on-chip system, where the on-chip system is connected to a user space that carries N operating systems, where N is a positive integer, and the virtualization method includes: virtualizing the PCIe of the on-chip system to generate at least N virtual interfaces; virtualizing the video encoding and decoding device of the on-chip system to generate N virtual video encoding and decoding devices: virtualizing the JPEG encoding and decoding device of the on-chip system to generate N virtual JPEG encoding and decoding devices; virtualizing the physical function of the on-chip system to generate N virtual functions: configuring one of those virtual interfaces to each operating system: configuring one of those virtual video encoding and decoding devices to that operating system: configuring one of those virtual JPEG encoding and decoding devices to that operating system; and configuring one of those virtual functions to that operating system.

B15. The virtualization method of B14, where the video encoding and decoding device includes: M video encoding and decoding units, where virtualizing the video encoding and decoding device of the on-chip system includes: configuring one of these video encoding and decoding units to each virtual video encoding and decoding device, where M and N are positive integers and M is not less than N.

B16. The virtualization method of B14, where the JPEG encoding and decoding device includes: M JPEG encoding and decoding units, where the virtualizing the JPEG encoding and decoding device of the on-chip system includes: configuring one of these JPEG encoding and decoding units to each virtual JPEG encoding and decoding device, where M and N are positive integers and M is not less than N.

B17. The virtualization method of B14, further comprising: virtualizing a computing device of the on-chip system to generate N virtual computing devices; and configuring one of these virtual computing devices to the operating system.

B18. The virtualization method of B14, further comprising: virtualizing a storage device of the on-chip system to generate N virtual storage devices; and configuring one of these virtual storage devices to the operating system.

B19. The virtualization method of B14, further comprising: virtualizing a processor of the user space to generate N virtual processors: virtualizing a memory of the user space to generate N virtual memories: configuring one of those virtual processors to the operating system; and configuring one of those virtual memories to the operating system.

B20. A computer-readable storage medium, on which computer program code for virtualization based on an on-chip system is stored, where the virtualization method of any one of B14-B19 is executed when the computer program code is run by a processor. 2020101315019

202010130697X C1. A machine learning device connected to a user space that carries N operating systems, where N is a positive integer, and the machine learning device includes: a PCIe virtualized into at least N virtual interfaces: a storage device virtualized into N virtual storage devices; and an ROM with firmware stored, where the firmware includes a physical function used to configure the PCIe; and N virtual functions managed by the physical function, and each virtual function corresponds to a virtual interface, where each operating system accesses a virtual storage device through a virtual interface to perform a task of that operating system.

C2. The machine learning device of C1, where the storage device is a DRAM.

C3. The machine learning device of C2, where the storage device includes M DDR channels, and M is a positive integer not less than N.

C4. The machine learning device of C3, where each virtual storage device includes at least one DDR channel.

C5. The machine learning device of C1, further comprising: a computing device virtualized into N virtual computing devices, where each operating system accesses a virtual computing device to perform a task of that operating system.

C6. The machine learning device of C5, where the computing device further includes a storage unit core virtualized into N virtual storage unit cores, and each virtual computing device corresponds to one virtual storage unit core.

C7. The machine learning device of C5, where the computing device is an IPU configured to execute convolution computation of a neural network.

C8. The machine learning device of C1, further comprising: a video encoding and decoding device virtualized into N virtual video encoding and decoding devices, where each operating system accesses a virtual video encoding and decoding device to perform a task of that operating system.

C9. The machine learning device of C1, further comprising: a JPEG encoding and decoding device virtualized into N virtual JPEG encoding and decoding devices, where each operating system accesses a virtual JPEG encoding and decoding device to perform a task of that operating system.

C10. The machine learning device of C1 connected to the user space through a kernel space, where the kernel space carries a kernel virtual machine configured to virtualize the kernel space.

C11. The machine learning device of C10, where the kernel space carries a chip driver program to drive the physical function.

C12. The machine learning device of C1, where the user space includes a processor and a memory, and the user space carries a user virtual machine to virtualize the processor into N virtual processors and the memory into N virtual memories, where each operating system accesses a virtual processor and a virtual memory to perform a task of the operating system.

C13. The machine learning device of C12, where the user virtual machine is a QEMU.

C14. A board card comprising the machine learning device of any one of C1-13.

C15. A virtualization method based on an on-chip system, where the on-chip system is connected to a user space that carries N operating systems, where N is a positive integer, and the virtualization method includes: virtualizing the PCIe of the on-chip system to generate at least N virtual interfaces: virtualizing the storage device of the on-chip system to generate N virtual storage devices: virtualizing the physical function of the on-chip system to generate N virtual functions: configuring one of those virtual interfaces to each operating system: configuring one of those virtual storage devices to that operating system; and configuring one of those virtual functions to that operating system.

C16. The virtualization method of C15, where the storage device includes M DDR channels, and M is a positive integer not less than N, where the virtualizing the storage device of the on-chip system includes: configuring one of these DDR channels to each virtual storage device.

C17. The virtualization method of C15, further comprising: virtualizing a computing device of the on-chip system to generate N virtual computing devices; and configuring one of those virtual computing devices to the operating system.

C18. The virtualization method of C17, where the virtualizing a computing device of the on-chip system includes: virtualizing a shared storage unit to generate N virtual shared storage units: virtualizing a storage unit core to generate N virtual storage unit cores: configuring one of these virtual shared storage units to the virtual computing device; and configuring one of these virtual storage unit cores to the virtual computing device.

C19. The virtualization method of C15, further comprising: virtualizing a video encoding and decoding device of the on-chip system to generate N virtual video encoding and decoding devices; and configuring one of those virtual video encoding and decoding devices to the operating system.

C20. The virtualization method of C15, further comprising: virtualizing a JPEG encoding and decoding device of the on-chip system to generate N virtual JPEG encoding and decoding devices; and configuring one of those virtual JPEG encoding and decoding devices to the operating system.

C21. The virtualization method of C15, further comprising: virtualizing a processor of the user space to generate N virtual processors: virtualizing a memory of the user space to generate N virtual memories: configuring one of those virtual processors to the operating system; and configuring one of those virtual memories to the operating system.

C22. A computer-readable storage medium, on which computer program code for virtualization based on an on-chip system is stored, where the method of any one of C15-C21 is executed when the computer program code is run by a processor. 202010130697X 2020101307135 D1. A neural network computing device virtualized into N virtual computing devices, comprising: M clusters configured to each virtual computing device, where M and N are positive integers, and M is not less than N.

D2. The neural network computing device of D1, where each virtual computing device includes at least one cluster.

D3. The neural network computing device of D1, where the neural network computing device is an IPU configured to execute convolution computation.

D4. The neural network computing device of D1, further comprising a shared storage unit virtualized into N virtual shared storage units, and each virtual computing device corresponds to one virtual shared storage unit, where the virtual shared storage unit is configured to temporarily store a computed intermediate value of the virtual computing device.

D5. The neural network computing device of D1, further comprising a storage unit core virtualized into N virtual storage unit cores, and each virtual computing device corresponds to one virtual storage unit core.

D6. The neural network computing device of D5, connected to a storage device that is virtualized into N virtual storage devices, where each virtual computing device corresponds to a virtual storage device.

D7. The neural network computing device of D1, connected to a PCIe that is virtualized into at least N virtual interfaces, where each virtual interface corresponds to a virtual computing device that receives and performs a task from the virtual interface.

D8. The neural network computing device of D7, where the PCIe is configured by a physical function that manages N virtual functions, where each virtual function corresponds to a virtual interface.

D9. The neural network computing device of D7, where the PCIe is connected to a user space that includes a processor and a memory and carries a user virtual machine for virtualizing the processor into N virtual processors and the memory into N virtual memories, where each virtual processor sends the task to a corresponding virtual computing device through a virtual interface.

D10. An integrated circuit device comprising the neural network computing device of any one of D1-D9.

D11. A board card comprising the integrated circuit device of D10.

D12. A virtualization method based on a neural network computing device, where the neural network computing device includes M clusters and receives a task from a user space, which includes N operating systems, and the virtualization method includes: virtualizing the neural network computing device to generate N virtual computing devices: configuring at least one of those clusters to each virtual computing device; and configuring one of those virtual computing devices to each operating system: where M and N are positive integers, and M is not less than N.

D13. The virtualization method of D12, where the virtualizing the neural network computing device includes: virtualizing a shared storage unit to generate N virtual shared storage units; and configuring one of these virtual shared storage units to the virtual computing device.

D14. The virtualization method of D12, where the virtualizing the neural network computing device includes: virtualizing a storage unit core to generate N virtual storage unit cores; and configuring one of these virtual storage unit cores to the virtual computing device.

D15. The virtualization method of D12, where the neural network computing device interacts with a storage device, and the virtualization method further includes: virtualizing the storage device to generate N virtual storage devices; and configuring one of these virtual storage devices to the operating system.

D16. The virtualization method of D12, where the neural network computing device interacts with a PCIe, and the virtualization method further includes: virtualizing the PCIe to generate at least N virtual interfaces; and configuring one of those virtual interfaces to the operating system.

D17. The virtualization method of D12, where the neural network computing device interacts with a physical function, and the virtualization method further includes: virtualizing the physical function to generate N virtual functions; and configuring one of those virtual functions to the operating system.

D18. The virtualization method of D12, further comprising: virtualizing a processor of the user space to generate N virtual processors: virtualizing a memory of the user space to generate N virtual memories: configuring one of those virtual processors to the operating system; and configuring one of those virtual memories to the operating system.

D19. A computer-readable storage medium, on which computer program code for virtualization based on a neural network computing device is stored, where the method of any one of D12-D18 is executed when the computer program code is run by a processor.

2020111771747 E1. An on-chip system, comprising: a virtual computing device configured to perform convolution computation of a neural network: a virtual video encoding and decoding device configured to perform video encoding and decoding: a virtual JPEG encoding and decoding device configured to perform JPEG encoding and decoding; and a virtual storage device configured to store data.

E2. The on-chip system of E1, further comprising: a virtual interface and virtual functions, where a guest operating system accesses the virtual computing device, the virtual video encoding and decoding device, the virtual JPEG encoding and decoding device and the virtual storage device through the virtual interface and the virtual functions.

E3. The on-chip system of E1, where the virtual computing device includes at least one cluster.

E4. The on-chip system of E3, where the virtual computing device includes a virtual shared storage unit configured to temporarily store a computed intermediate value of the cluster.

E5. The on-chip system of E1, where the virtual computing device includes a virtual storage unit core configured to control data exchange.

E6. The on-chip system of E1, where the virtual video encoding and decoding device includes at least one video encoding and decoding unit.

E7. The on-chip system of E1, where the virtual JPEG encoding and decoding device includes at least one JPEG encoding and decoding unit.

E8. The on-chip system of E1, where the virtual storage device includes at least one DDR channel.

E9. A board card comprising the on-chip system of any one of E1-E8. 2020111771747

2020111772078 F1. A machine learning device comprising N virtual components and M units, where N and M are positive integers, and M is greater than N; each virtual component is configured with at least one unit to perform a task of the virtual component.

F2. The machine learning device of F1, where M-N units are idle.

F3. The machine learning device of F1, where M-N units are configured to some of the N virtual components so that some of the virtual components are configured with a plurality of units.

F4. The machine learning device of F1, where the virtual components are virtual computing devices, and the units are clusters.

F5. The machine learning device of F1, where the virtual components are virtual video encoding and decoding devices, and the units are video encoding and decoding units.

F6. The machine learning device of F1, where the virtual components are virtual JPEG encoding and decoding devices, and the units are JPEG encoding and decoding units.

F7. The machine learning device of F1, where the virtual components are virtual storage devices, and the units are DDR channels.

F8. The machine learning device of F1, where the units are virtual interfaces.

F9. A board card comprising the machine learning device of any one of F1-F8. 2020111772078

What is claimed:

1. A machine learning device connected to a user space that carries N operating systems, wherein N is a positive integer, and the machine learning device comprises:

a PCIe (Peripheral Component Interconnect Express) virtualized into at least N virtual interfaces;

a computing device virtualized into N virtual computing devices, wherein each virtual computing device of the N virtual computer devices includes M clusters and M is an integer not less than N;

a ROM (Read-Only Memory) with firmware stored, wherein the firmware comprises a physical function used to configure the PCIe; and N virtual functions managed by the physical function, wherein each virtual function of the N virtual functions corresponds to a respective virtual interface of the at least N virtual interfaces, wherein each operating system of the N operating systems accesses a virtual computing device of the N virtual computing devices through a virtual interface of the at least N virtual interfaces to perform a task of the respective operating system on a cluster of the virtual computing device, the task associated with a virtual function managed by the physical function and corresponding to the virtual interface.

2. The machine learning device of claim 1, wherein the computing device comprises an IPU (intelligent processing unit) configured to execute convolution computation of a neural network.

3. The machine learning device of claim 1, wherein each virtual computing device of the N virtual computing devices includes at least one cluster.

4. The machine learning device of claim 1, wherein the computing device further comprises:

a shared storage unit configured to temporarily store computed intermediate values of the M clusters; and the shared storage unit is virtualized into N virtual shared storage units, wherein each virtual computing device of the N virtual computing devices corresponds to one virtual shared storage unit of the N virtual shared storage units.

5. The machine learning device of claim 1, further comprising:

a storage device virtualized into N storage devices, wherein each operating system of the N operating systems accesses a virtual storage device to perform the task of the respective operating system.

6. The machine learning device of claim 5, wherein the computing device further comprises:

a storage unit core virtualized into N virtual storage unit cores, wherein each virtual computing device of the N virtual computing devices is configured with one virtual storage unit core.

7. The machine learning device of claim 1, further comprising:

a video encoding and decoding device virtualized into N virtual video encoding and decoding devices, wherein each operating system of the N operating systems accesses a virtual video encoding and decoding device of the N virtual video encoding and decoding devices to perform the task of the respective operating system.

8. The machine learning device of claim 1, further comprising:

a JPEG (Joint Photographic Experts Group) encoding and decoding device virtualized into N virtual JPEG encoding and decoding devices, wherein each operating system of the N operating systems accesses a virtual JPEG encoding and decoding device of the N virtual JPEG encoding and decoding devices to perform the task of the respective operating system.

9. The machine learning device of claim 1, wherein the machine learning device is connected to the user space through a kernel space, wherein the kernel space carries a kernel virtual machine configured to virtualize the kernel space.

10. The machine learning device of claim 9, wherein the kernel space further carries a driver program to drive the physical function.

11. The machine learning device of claim 1, wherein the user space comprises a processor and a memory, and the user space carries a user virtual machine to virtualize the processor into N virtual processors and the memory into N virtual memories, wherein each operating system of the N operating systems accesses a virtual processor of the N virtual processors and a virtual memory of the N virtual memories to perform the task of the respective operating system.

12. The machine learning device of claim 11, wherein the user virtual machine is implemented through a QEMU (quick emulator).

13. A virtualization method based on an on-chip system, wherein the on-chip system is connected to a user space that carries N operating systems, wherein N is a positive integer, and the virtualization method comprises:

virtualizing a PCIe of the on-chip system to generate at least N virtual interfaces;

virtualizing a computing device of the on-chip system to generate N virtual computing devices, wherein each virtual computing device of the N virtual computer devices includes M clusters and M is an integer not less than N;

virtualizing a physical function of the on-chip system to generate N virtual functions, wherein each virtual function of the N virtual functions corresponds to a respective virtual interface of the at least N virtual interfaces;

configuring one of the N virtual interfaces to each operating system of the N operating systems;

configuring one of the N virtual computing devices to the operating system; and configuring one of the N virtual functions to the operating system;

wherein each operating system of the N operating systems accesses a virtual computing device of the N virtual computing devices through a virtual interface of the at least N virtual interfaces to perform a task of the respective operating system on a cluster of the virtual computing device, the task associated with a virtual function managed by the physical function and corresponding to the virtual interface.

14. The virtualization method of claim 13, wherein the virtualizing of the computing device of the on-chip system comprises:

virtualizing a shared storage unit to generate N virtual shared storage units; and configuring one of the N virtual shared storage units to the virtual computing device.

15. The virtualization method of claim 13, wherein the virtualizing of the computing device of the on-chip system comprises:

virtualizing a storage unit core to generate N virtual storage unit cores; and configuring one of the N virtual storage unit cores to the virtual computing device.

16. The virtualization method of claim 13, further comprising:

virtualizing a storage device of the on-chip system to generate N virtual storage devices; and configuring one of the N virtual storage devices to the respective operating system.

17. The virtualization method of claim 13, further comprising:

virtualizing a video encoding and decoding device of the on-chip system to generate N virtual video encoding and decoding devices; and configuring one of the N virtual video encoding and decoding devices to the respective operating system.

18. The virtualization method of claim 13, further comprising:

virtualizing a JPEG encoding and decoding device of the on-chip system to generate N virtual JPEG encoding and decoding devices; and configuring one of the N virtual JPEG encoding and decoding devices to the respective operating system.

19. The virtualization method of claim 13, further comprising:

virtualizing a processor of the user space to generate N virtual processors;

virtualizing a memory of the user space to generate N virtual memories;

configuring one of the N virtual processors to the respective operating system; and configuring one of the N virtual memories to the respective operating system.

* * * * *